(12) United States Patent
Goto et al.

(10) Patent No.: US 6,459,970 B2
(45) Date of Patent: Oct. 1, 2002

(54) CONTROL DATA SETTING METHOD AND DATA STORAGE MEDIUM OF ACTIVE MOUNT CONTROL APPARATUS

(75) Inventors: Katsuhiro Goto; Yoshihiko Hagino; Katsuhisa Yano, all of Inuyama; Tatsuya Suzuki, Kasugai, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/881,692

(22) Filed: Jun. 18, 2001

(30) Foreign Application Priority Data

Jun. 19, 2000 (JP) ........................................ 2000-183327

(51) Int. Cl.$^7$ .............................. G06F 7/00; G06F 9/00; G06F 17/00
(52) U.S. Cl. .............................. 701/36; 701/37; 701/99; 267/140.11; 267/140.13; 267/140.14; 267/140.15; 267/141; 267/267; 267/136; 267/219; 248/562; 248/566; 381/71.11; 381/71.9; 180/300; 180/312; 700/280
(58) Field of Search .............................. 701/36, 37, 99; 267/140.11, 140.13, 140.14, 141, 267, 136, 219, 140.15, 140.12; 248/562, 566, 636, 550; 381/71.11, 71.9; 180/300, 312, 292; 440/84; 700/280

(56) References Cited

U.S. PATENT DOCUMENTS

| | | | | |
|---|---|---|---|---|
| 5,038,886 A | * | 8/1991 | Shibayama | 180/292 |
| 5,154,403 A | * | 10/1992 | Sato | 180/300 |
| 5,386,372 A | * | 1/1995 | Kobayashi et al. | 700/280 |
| 5,439,204 A | * | 8/1995 | Yamazoe et al. | 267/140.14 |
| 5,544,080 A | * | 8/1996 | Kobayashi et al. | 381/71.11 |
| 5,611,754 A | * | 3/1997 | Haga et al. | 477/181 |
| 6,120,012 A | * | 9/2000 | Shibata et al. | 267/140.14 |
| 6,158,415 A | * | 12/2000 | Ichikawa et al. | 123/192.1 |
| 2001/0026038 A1 | * | 10/2001 | Muramatsu et al. | 267/140.11 |
| 2001/0053951 A1 | * | 12/2001 | Goto et al. | 701/36 |
| 2002/0005607 A1 | * | 1/2002 | Muramatsu et al. | 267/140.11 |

* cited by examiner

Primary Examiner—Yonel Beaulieu
Assistant Examiner—Ronnie Mancho
(74) Attorney, Agent, or Firm—Oblon, Spivak, McClelland, Maier & Neustadt, P.C.

(57) ABSTRACT

Control data such as an optimal filter coefficient or the like of an engine mount is obtained by adaptation control or the like with respect to a reference vehicle F provided with a reference engine mount 20k, and the control data is stored in a reference data map storage medium 35 as a reference data map. Mount characteristics of the reference engine mount and a mass-produced engine mount 20m are measured. A correction data map which is a deviation from the reference data map is obtained for the control data of the mass-produced engine mount from a difference between both the mount characteristics, and the correction data map is stored in the correction data map storage medium 36. Both the data map storage media are added to the active control apparatus of the mass-produced vehicle M. Using both the data maps, it is possible to appropriately and actively control the vibration of the mass-produced vehicle without variation.

11 Claims, 6 Drawing Sheets

BACKGROUND ART

BACKGROUND ART

CONTROL DATA SETTING METHOD AND DATA STORAGE MEDIUM OF ACTIVE MOUNT CONTROL APPARATUS

BACKGROUND OF THE INVENTION

FIELD OF THE INVENTION

The present invention relates to a control data setting method and a data storage medium of an active mount control apparatus for controlling an active mount which actively suppresses vibrations of a vehicle body.

Conventionally, as an active control method of an engine mount which is an active mount provided in an automobile, adaptation control section 40 using a delay harmonic synthesizer minimum average square filter (DXHS LMS filter, hereinafter) is applied to a control apparatus 30 of an experiment vehicle F as shown in FIGS. 6 and 7 for example, an optimal filter coefficient at each arbitrary revolution number (frequency) is obtained and such coefficient is stored as a reference data map. The stored data map 46 is taken out in the form of an ROM, and it is applied to the control apparatus 30 of a mass-produced vehicle M as shown in FIGS. 8 and 9, and the active control is carried out. That is, a crankshaft revolution pulse and the like is taken out from a vibration generation source 51 such as an engine or the like of an automobile which is a signal source by means of a sensor 12, a frequency judging section 41 judges that the taken out value is a frequency ω to be controlled, and a signal to be controlled of the frequency ω to be controlled is selected and output. This signal x is corrected in amplitude and phase by a filter coefficient of the data map 46, and synthesized into a sinusoidal signal and output. The output signal y is supplied to a system 43 to be controlled (transmission function G), and a processing signal z is output. With this processing signal z, external forced is suppressed through a transmission system 52 (G') which is vibration of the engine or the like. With this operation, a sensor for detecting vibration can be omitted in the control apparatus 30, and a structure of the control apparatus 30 can be simplified as compared with the adaptation control apparatus.

The adaptation control method using the DXHS LMS filter reduces the amount of calculation of the filter coefficient in an adaptation minimum average square filter (Filtered-X LMS), and is carried out in the following manner. In the adaptation control, as shown in FIGS. 6 and 7, the crankshaft revolution pulse or the like is taken out from a vibration generation source 51a such as an engine or the like of a automobile F which is a signal source by means of a sensor 12, the frequency judging section 41 judges that the taken out value is a frequency ω to be controlled, and a signal to be controlled of the frequency ω to be controlled is selected and output to an adaptation filter W42. This signal x is corrected in amplitude and phase by a filter coefficient of an adaptation filter W42, and synthesize into a sinusoidal signal and output. The output signal y is supplied to a system 43 to be controlled (transmission function G), and a processing signal z is output. In the processing signal z, an external force d through a transmission system 52a (G') which is vibration of the engine or the like is added and detected as an observed value in the observing point by a sensor. In the vibration control, a target of detection value of the sensor is 0, and a difference with respect to the target is an error signal e. Using the error signal e(n) and an estimated value of an estimated transmission function 44 which was previously defined, the adaptation filter W is sequentially renewed by a digital filter 45 (DXHS LMS).

However, mass-produced engine mounts are varied in mount performance especially depending upon production lots. Therefore, if the above reference data map is input uniformly to active mount control apparatuses for vehicles in which engine mounts of different production lots are utilized, since there is variation in engine mounts, the vibration control effect is not sufficiently exhibited or vibrations may be worsened on the contrary.

SUMMARY OF THE INVENTION

The present invention is for solving the above problems, and it is an object of the invention to provide a control data setting method and a data storage medium of an active mount control apparatus capable of appropriately and easily obtaining the vibration reduction effect by the active control with respect to the mass-produced active mount.

To achieve the above object, the present invention provides a control data setting method of an active mount control apparatus in which a pulse signal of periodicity is applied from a vibration generating source of a vehicle to an active mount which is a mount having a vibrator provided in the vehicle to obtain control data of the active mount in a frequency band to be controlled to suppress vehicle body vibration, thereby forming a data map, the data map is input to the active mount control apparatus which suppresses external force from the vibration generating source by controlling motion of the vibrator based on the control data, wherein a reference mount characteristic which is a mount characteristic of a reference active mount is previously measured, the control data of a reference vehicle having the reference active mount is obtained and this is determined as a reference data map, a mass-produced mount characteristic which is a mount characteristic of at least one of mass-produced active mounts of a predetermined production unit is measured, the reference mount characteristic and the mass-produced mount characteristic are compared with each other to form a correction data map for correcting deviation of control data corresponding to the mass-produced mount from the reference data map, and the reference data map and the correction data map are input to the active mount control apparatus provided in a mass-produced vehicle having the mass-produced active mount.

In the present invention, the pulse signal or the like of periodicity is applied from a vibration generating source of a vehicle to a reference vehicle having a reference active mount to obtain control characteristic of the active mount, thereby forming the reference data map. The mount characteristic of the reference active mount is obtained and defined as the reference mount characteristic. The mount characteristic of at least one of the active mounts of the predetermined production unit mounted to the mass-produced vehicles is obtained and defined as the mass-produced mount characteristic. The mass-produced mount characteristic and the reference mount characteristic are compared with each other, and the correction data map for correcting deviation of the control data which corresponds to the mass-produced active mount from the above reference data map is obtained from the difference. The reference data map and the correction data map are input to the active mount control apparatus provided in the mass-produced vehicle having the mass-produced active mount, and based on both the data maps, the vibration of the vehicle body is controlled by the active mount control apparatus.

As a result, according to the invention, the deviation of the control data with respect to the reference active mount of the mass-produced active mount which can not control vibration appropriately only with the reference data map is corrected with data of the correction data map adjusted in accordance with the active mount, thereby appropriately and actively control the variation of the vibration of the vehicle. Further, according to the invention, the mount characteristic of the mass-produced active mount is measured, and is compared with the mount characteristic of the reference active mount, thereby obtaining the correction data map. Therefore, the correction data map can be formed inexpensively.

Further, in the control data setting method of the active mount control apparatus, the reference data map can be previously input to the active mount control apparatus, and the correction data map corresponding to the mass-produced active mount mounted in a mass-produced vehicle is input. If the reference data map of the reference active mount is previously input into the active mount control apparatus in this manner, it is only necessary to input the correction data map which was slightly adjusted in accordance with the mass-produced active mount mounted in the vehicle. Therefore, the vibration can appropriately and easily be controlled in accordance with the mass-produced active mount.

Further, the reference data map and/or the correction data map can be input to the active mount control apparatus through a communication line. If at least one of the reference data map and the correction data map can be input to the active mount control apparatus through a communication line, data can swiftly be transferred even if the data map forming place and the data utilizing place are separated from each other, which is convenient.

Further, a storage medium storing the reference data map and/or a storage medium storing the correction data map can be formed, and the storage medium can be added to the active mount control apparatus. If at least one of the reference data map and the correction data map is stored in the storage medium in this manner, it is only necessary to add the storage medium to the active mount control apparatus. Therefore, data can be handled extremely conveniently including storage when the forming place of the reference data map or the correction data map and the data utilizing place are away from each other.

Either one of the reference data map and the correction data map can be input to the active mount control apparatus through a communication line, and the other one of them can be added to input to the active mount control apparatus by adding a storage medium which stores the other data map. If the data map is input to the active mount control apparatus through the communication line and the storage medium, merits of both of them can be obtained, data can swiftly be transferred and data can be handled extremely conveniently including storage when the forming place of the reference data map or the correction data map and the data utilizing place are away from each other.

In the control data setting method of an active mount control apparatus, the reference data map and the correction data map corresponding to a mass-produced active mount mounted to a mass-produced vehicle can be integrally input to the active mount control apparatus. Since the reference data map and the correction data map are formed at near places in many cases, it is possible to easily form both the data maps integrally, and integrally formed data map can be input to the active mount control apparatus at one time. Therefore, it is possible to reduce the labor of inputting the data map.

Further, the reference data map and the correction data map can be input to the active mount control apparatus through a communication line. With this feature, the reference data map and the correction data map can be input to the active mount control apparatus through the communication line at one time, which is convenient when the forming place of the reference data map and the correction data map and the data utilizing place are away from each other.

Further, a storage medium which stores the reference data map and the correction data map may be added to the active mount control apparatus. If the reference data map formed for the reference active mount and the correction data map formed in accordance with the mass-produced active mount are stored in the storage medium, it is only necessary to add the storage medium to the active mount control apparatus to be mounted in a vehicle. Therefore, data can swiftly be transferred and data can be handled extremely conveniently including storage when the forming place of the reference data map and the correction data map and the data utilizing place are away from each other.

The present invention is characterized in the data storage medium which stores the reference data map and/or correction data map. That is, a data storage medium which stored at least one of the reference data map and the correction data map is excellent in storage performance of data, it is convenient to utilize the data, and the data itself is easily handled commercially.

DETAILED DESCRIPTION OF PREFERRED EMBODIMENTS

Figure 1:
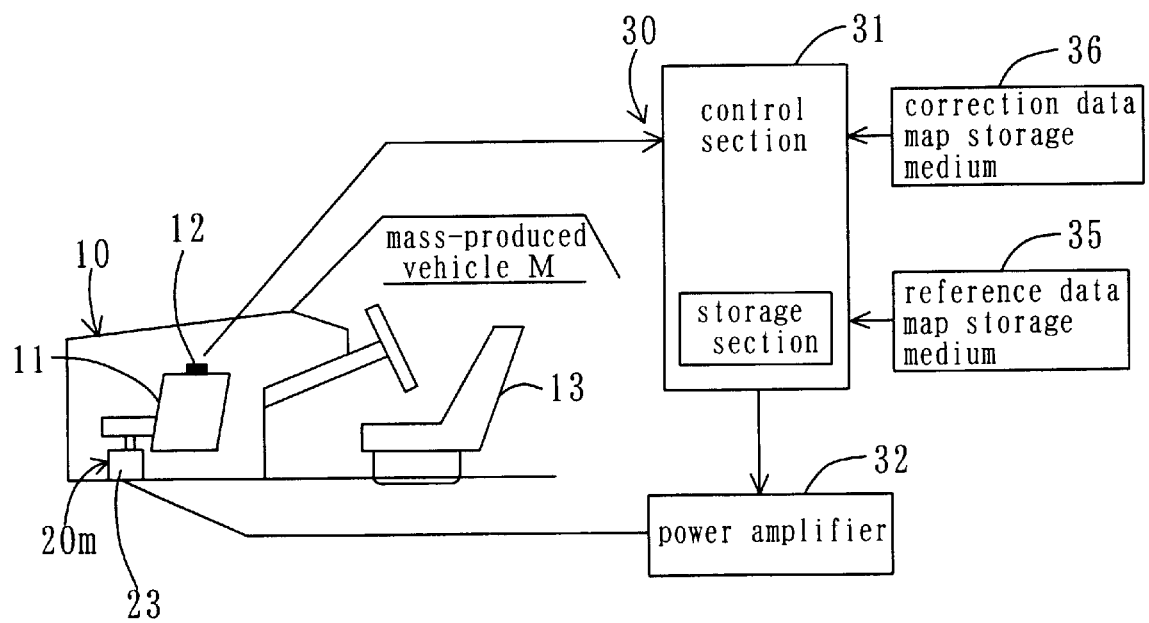
FIG. 1 is a diagram schematically showing a structure of an active control system for removing the vibration of a vehicle body of a mass-produced gasoline engine vehicle M in which a mass-produced engine mount is mounted according to an embodiment of the present invention.
Figure 2:
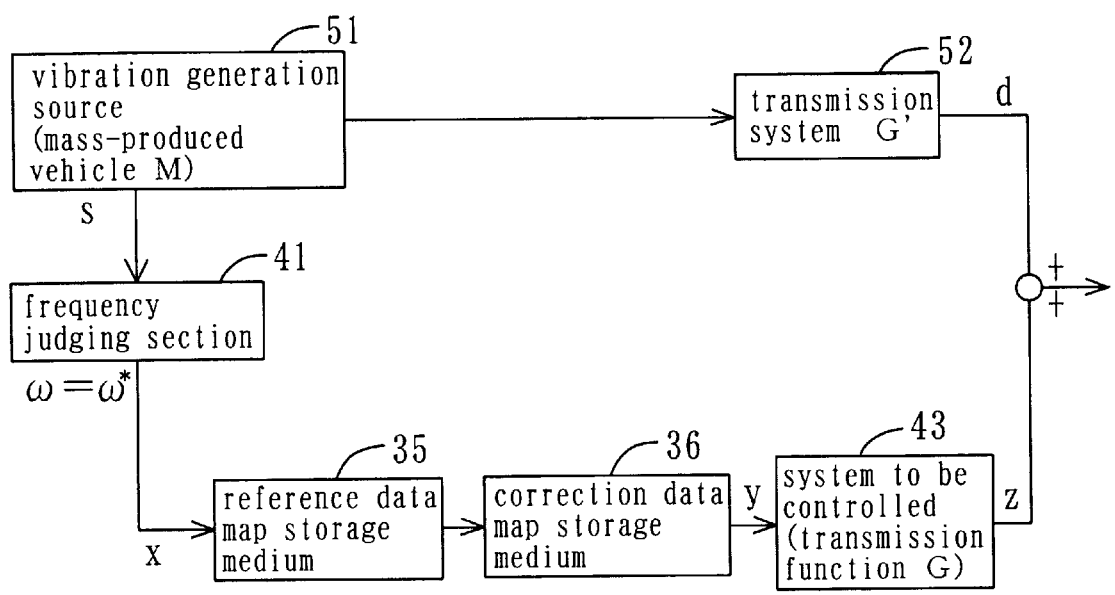
FIG. 2 is a block diagram showing the active control system.

An embodiment of the present invention will be explained using the drawings below. FIG. 1 is a diagram schematically showing a structure of an active control system for removing the vibration of a vehicle body of a mass-produced gasoline engine vehicle M in which a mass-produced engine mount having a vibrator is mounted according to an embodiment of the present invention, and FIG. 2 is a block diagram showing the active control system. A vehicle body 10 of the gasoline engine vehicle M is provided therein with an engine mount 20m having a vibrator (engine mount, hereinafter) which is an active mount.

Figure 3:
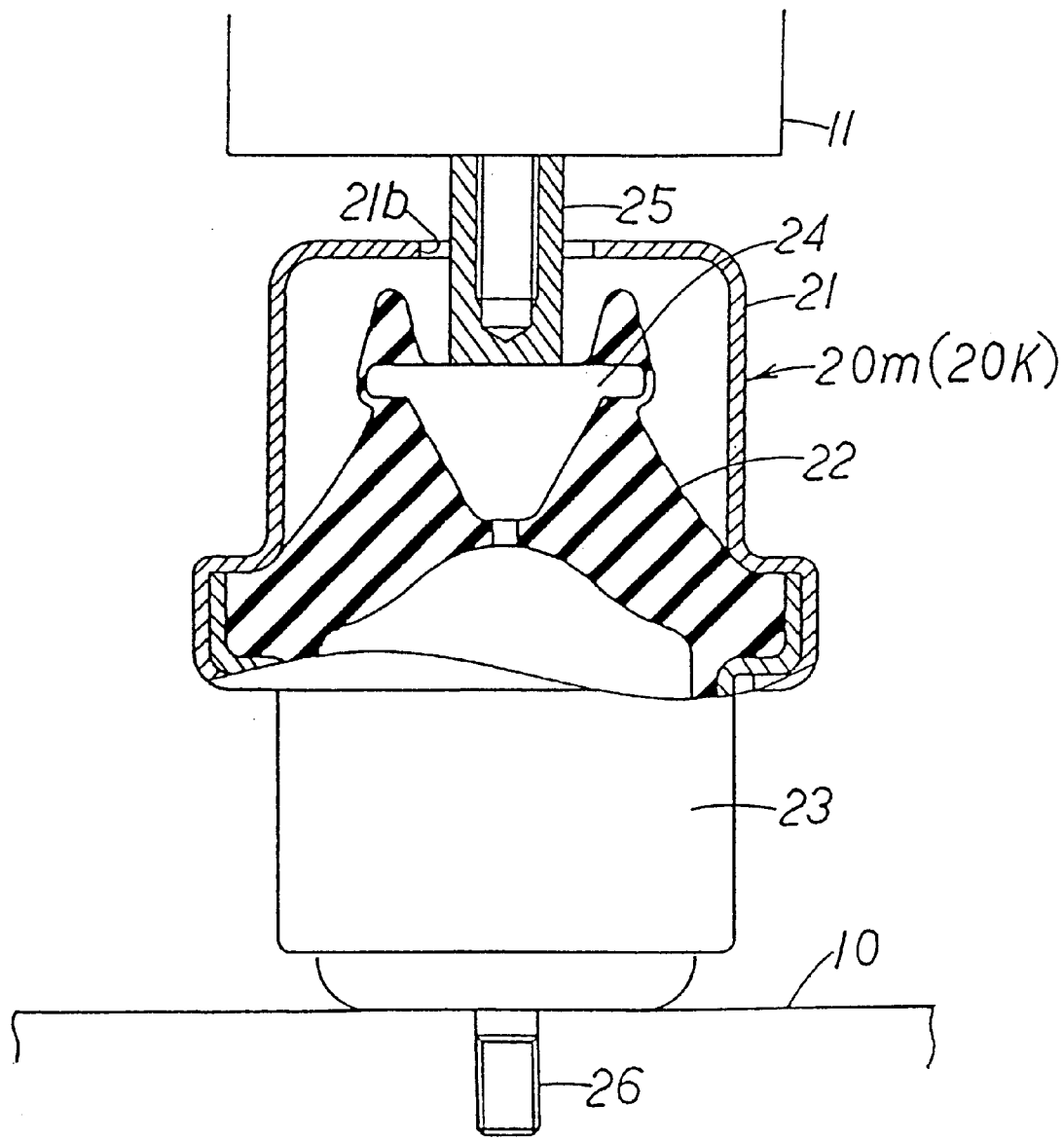
FIG. 3 is a partially cut-away sectional view showing an engine mount having an actuator used for the active control.

As shown in FIG. 3, the engine mount 20m has a cylindrical case 21. In the case 21, a vibration isolation rubber 22 and an actuator 23 for controlling a dynamic displacement of the engine are accommodated. The actuator 23 is located below the vibration isolation rubber 22. The vibration isolation rubber 22 is fixed to an inner wall at an intermediate portion of the case 21 in its axial direction, and is mounted to a fixing metal member 24. A fixing shaft 25 is mounted to a center position of the fixing metal member 24 in its axial direction, and a tip end of the fixing shaft 25 projects outward from a through hole 21a formed in one end of the case 21. A fixing shaft 26 is mounted to the other end of the case 21. The engine mount 20m is fixed to the vehicle body 10 by the fixing shaft 26, and an engine 11 is supported by mounting the engine 11 to the fixing shaft 25. A crankshaft of the engine 11 is provided with a revolution pulse sensor 12. The revolution pulse sensor 12 outputs a crankshaft revolution pulse signal, and a control section 31 (which will be described later) determines a basic frequency of the output signal based on the output crankshaft revolution pulse signal.

The mass-produced vehicle M is provided with an active control apparatus 30. The active control apparatus 30 is provided with a control section 31 comprising a microcomputer. The above revolution pulse sensor 12 is connected to an input side of the control section 31, and the actuator 23 of the engine mount 20m is connected to an output side of the control section 31 through a power amplifier 32. A reference data map storage medium 35 storing a reference data map which is a storage medium such as a CD-ROM, a FD or the like, and a correction data map storage medium 36 storing a correction data map are connected to the control section 31.

Next, with respect to an engine mount 20k (reference engine mount, hereinafter) which is a reference of a particular kind of engine mount product, a forming method of the reference data map storage medium 35 storing renewal data of a filter coefficient of adaptation control will be explained.

Figure 6:
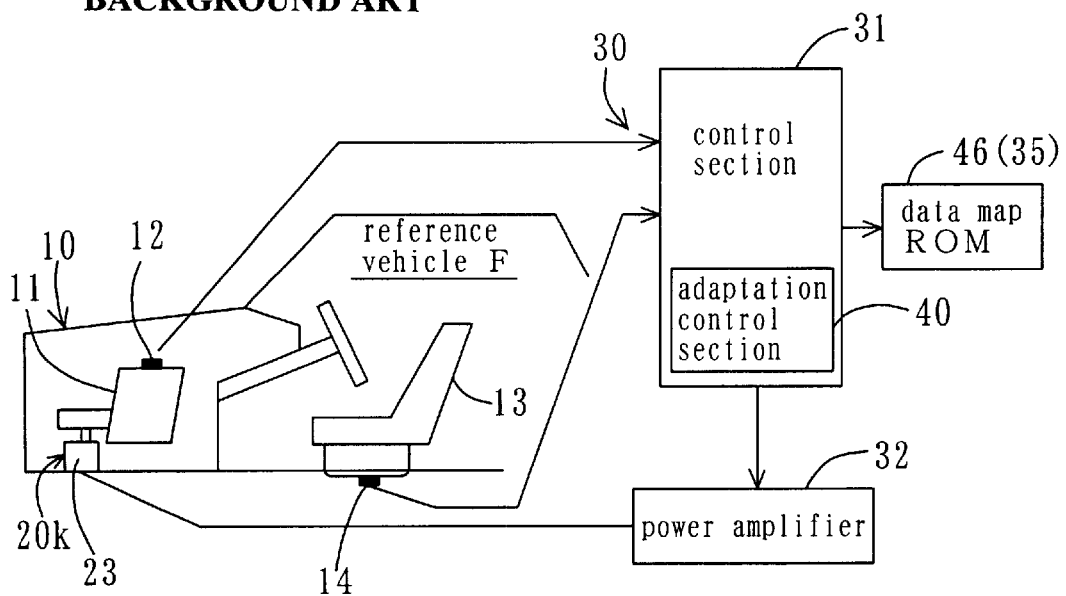
FIG. 6 is a diagram schematically showing a measuring system by adaptation control which measures the control data for removing the vibration of the vehicle body applied to a reference gasoline engine vehicle F.
Figure 7:
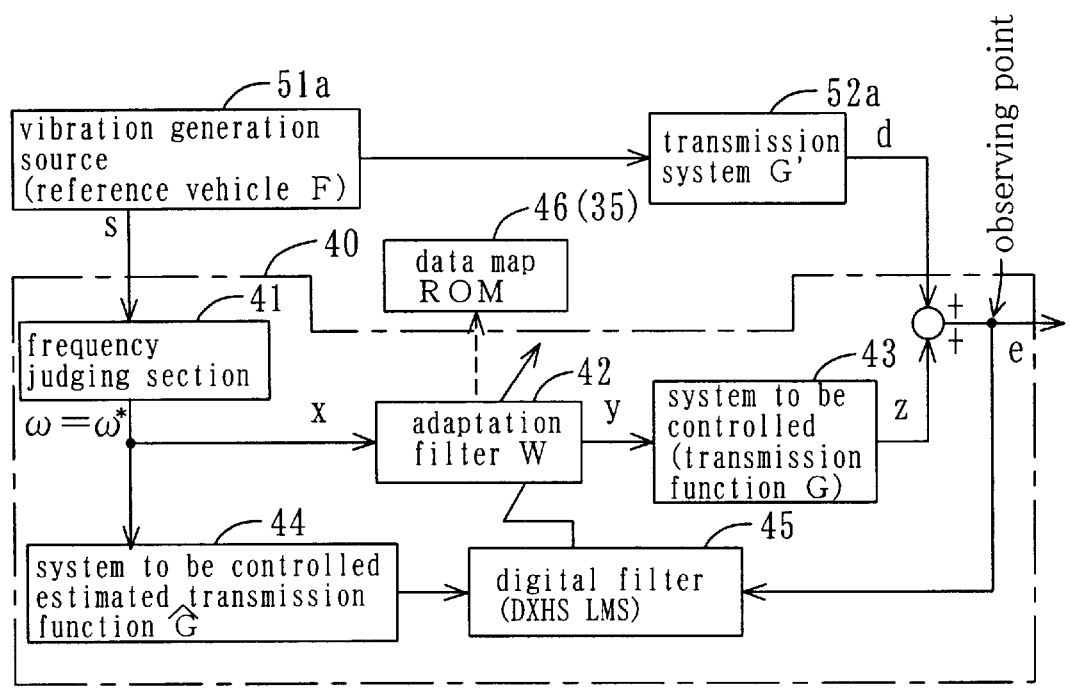
FIG. 7 is a block diagram schematically showing an adaptation control system using a DXHS LMS filter for removing the vibration.
Figure 8:
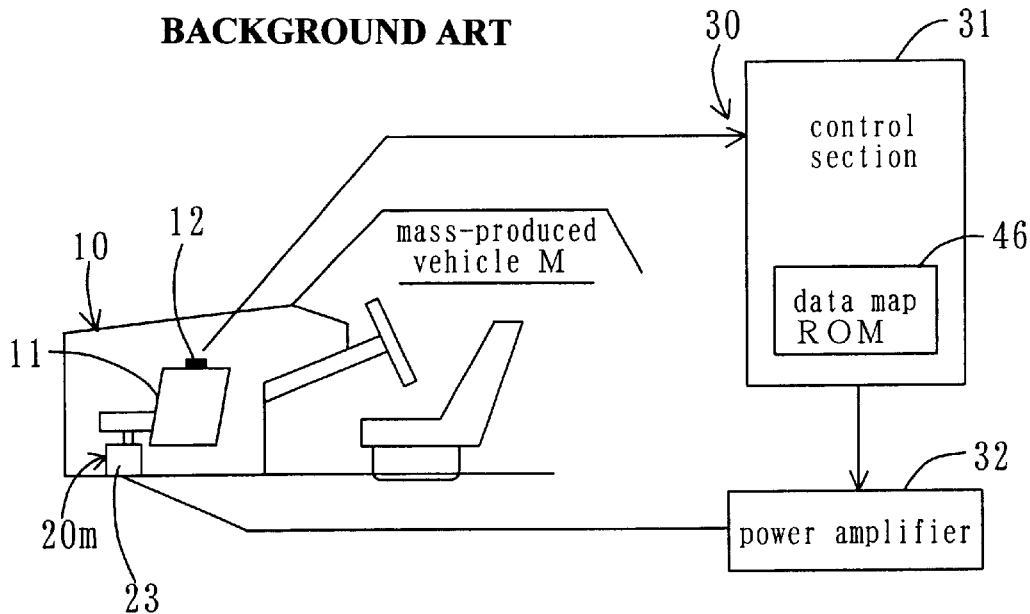
FIG. 8 is a diagram schematically showing a structure of the active control system for removing the vibration of a vehicle body of a mass-produced gasoline engine vehicle in which a mass-produced engine mount is mounted according to a conventional example.
Figure 9:
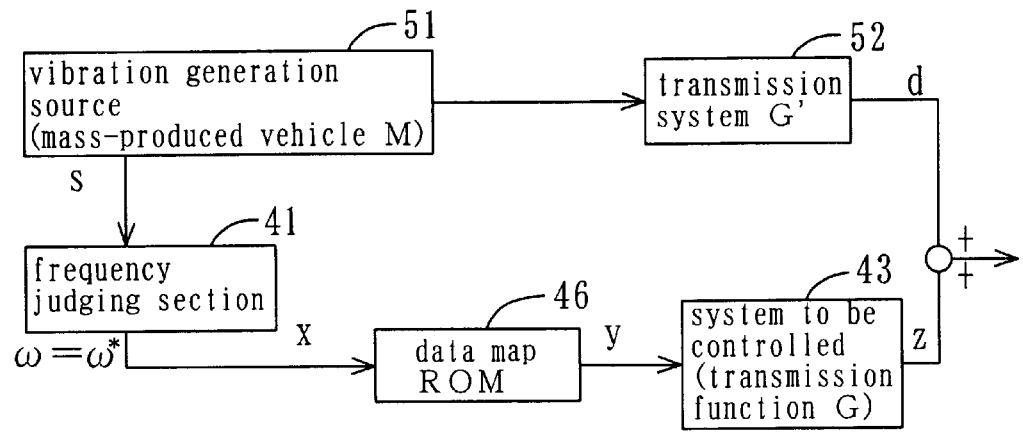
FIG. 9 is a block diagram showing the active control system.

As shown in FIG. 6, a pickup acceleration sensor 14 is mounted to a sheet 13 in a reference vehicle F, and the above-described DXHS LMS adaptation control is carried out. If the revolution number is swept in a revolution number (frequency) band to be controlled, a renewed optimal filter coefficient in an arbitrary revolution number can be obtained. A reference data map which is the data of the renewed optimal filter coefficient is stored in a storing section of the control section 31, and is stored in the reference data map storage medium 35. Thereafter, the reference data map storage medium 35 is detached from the control section 31.

Figure 4:
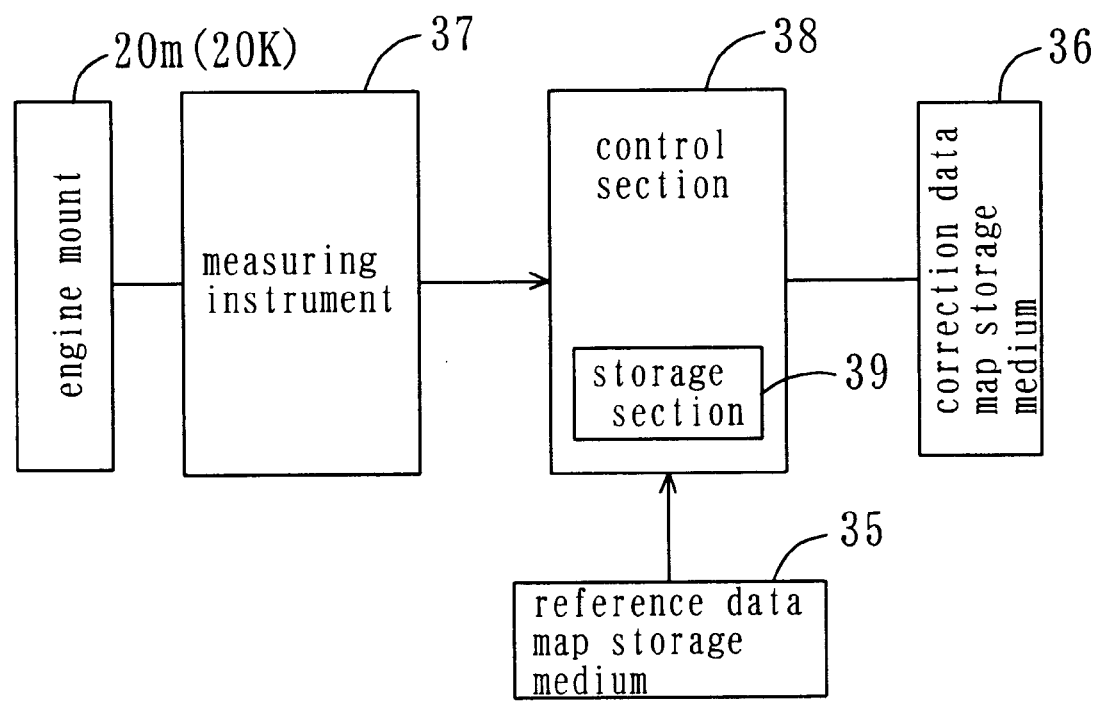
FIG. 4 is a diagram schematically showing a structure of control data measuring system for obtaining a correction data map for the mass-produced engine mount.

Next, the forming method of the correction data map for correcting deviation in control data concerning the engine mount 20m selected from a particular production lots in a mass-produced step with respect to the reference data map which is a control data of the above reference engine mount 20k will be explained. As shown in FIG. 4, a measuring system for forming the correction data map comprises a measuring instrument 37 for measuring a mount characteristic of the engine mount, and a control section 38 connected to the measuring instrument 37 for carrying out calculation. A storage section 39 provided in the control section 38 stores therein measuring data from the measuring instrument 37, and also stores therein conversion data used for calculating the correction data map from the measuring data. The above reference data map storage medium 35 which is a storage medium such as a CD-ROM, a FD or the like is connected to the control section 38 so that the control section 38 reads reference data map from the storage medium 35. Data of the reference data map may be input to the control section 38 directly from the control section 31 or may be input through another input means.

First, the mount characteristic is measured by the measuring instrument 37 for the reference engine mount 20k. Concerning the mount characteristic, a dynamic spring constant and phase (input displacement reference) are employed as a spring characteristic, and a generation force absolute value (amplitude value) and phase (voltage or current reference) are employed as a generation force characteristic. A reference mount characteristic which is a measured result is stored in the storage section 39. Next, a mount characteristic of the mass-produced engine mount 20m is measured by the measuring instrument 37, and is stored in the storage section 39 as a mass-produced mount characteristic. Next, in the control section 38, the reference mount characteristic and the mass-produced mount characteristic are compared with each other, and a correction data map which is a deviation from the reference data map is calculated based on a difference of the reference mount characteristic and the mass-produced mount characteristic by the reference data map and the conversion data stored in the storage section 39. The data is stored in the correction data map storage medium 36 connected to the control section 38. Thereafter, the correction data map storage medium 36 is detached from the control section 38.

As shown in FIG. 1, the reference data map storage medium 35 and the correction data map storage medium 36 detached from the control section 38 are connected to the control section 31 of the active control apparatus 30 of the mass-produced vehicle M which is produced at another place. Here, data of the storage media 35 and 36 is read by the control section 31 and stored in the storage section in some cases, and the storage media 35 and 36 are externally provided on the control section 31 in other cases.

As shown in FIG. 2, in the active control apparatus 30, the crankshaft revolution pulse or the like is taken out from the engine 11 (vibration generation source 51) which is a signal source by means of the sensor 12. The frequency judging section 41 judges that the taken out pulse is a frequency ω to be controlled, and a signal to be controlled of the frequency ω to be controlled is selected and output. This signal x is corrected in amplitude and phase by a filter coefficient stored in the reference data map storage medium 35. Further, the amplitude and phase are corrected by a correction filter coefficient stored in the correction data map storage medium 36 which corrects variation of the mass-produced engine mount 20m, and a signal is synthesized into a sinusoidal signal and output. The output signal y is supplied to a system 43 to be controlled (transmission function G), a processing signal z is output, and using the processing signal z, an external force d through a transmission system 52 (G') which is vibration or the like of the engine is suppressed.

As explained above, according to the present embodiment, when vibration is controlled by the active control apparatus 30 of the mass-produced vehicle M provided with the mass-produced engine mount 20m, even through the vibration can not appropriately be controlled only by the reference data map due to variation of the mass-produced engine mount 20m, it is possible to carry out appropriate active control having small variation with respect to the vibration of the vehicle by compensating the variation with data having adjusted correction data map. Further, the correction data map can be obtained by measuring the mount characteristic of the mass-produced engine mount 20m and by comparing this mount characteristic with a mount characteristic of the reference engine mount 20k. Therefore, the correction data map can be formed inexpensively. Further, since the reference data map and the correction data map are stored in the storage media 35 and 36, it is convenient to keep and utilize the data.

Both the reference data map storage medium 35 and the correction data map storage medium 36 can be added to the active control apparatus 30 of the mass-produced vehicle M simultaneously, but usually, only the reference data map storage medium 35 which is formed first is added to the active control apparatus 30, and the correction data map storage medium 36 which was newly obtained by mass producing the engine mount is added to the active control apparatus 30 which is mounted to a vehicle including the engine mount 20m in accordance with provision of the engine mount 20m.

Next, another embodiment will be explained.

Figure 5:
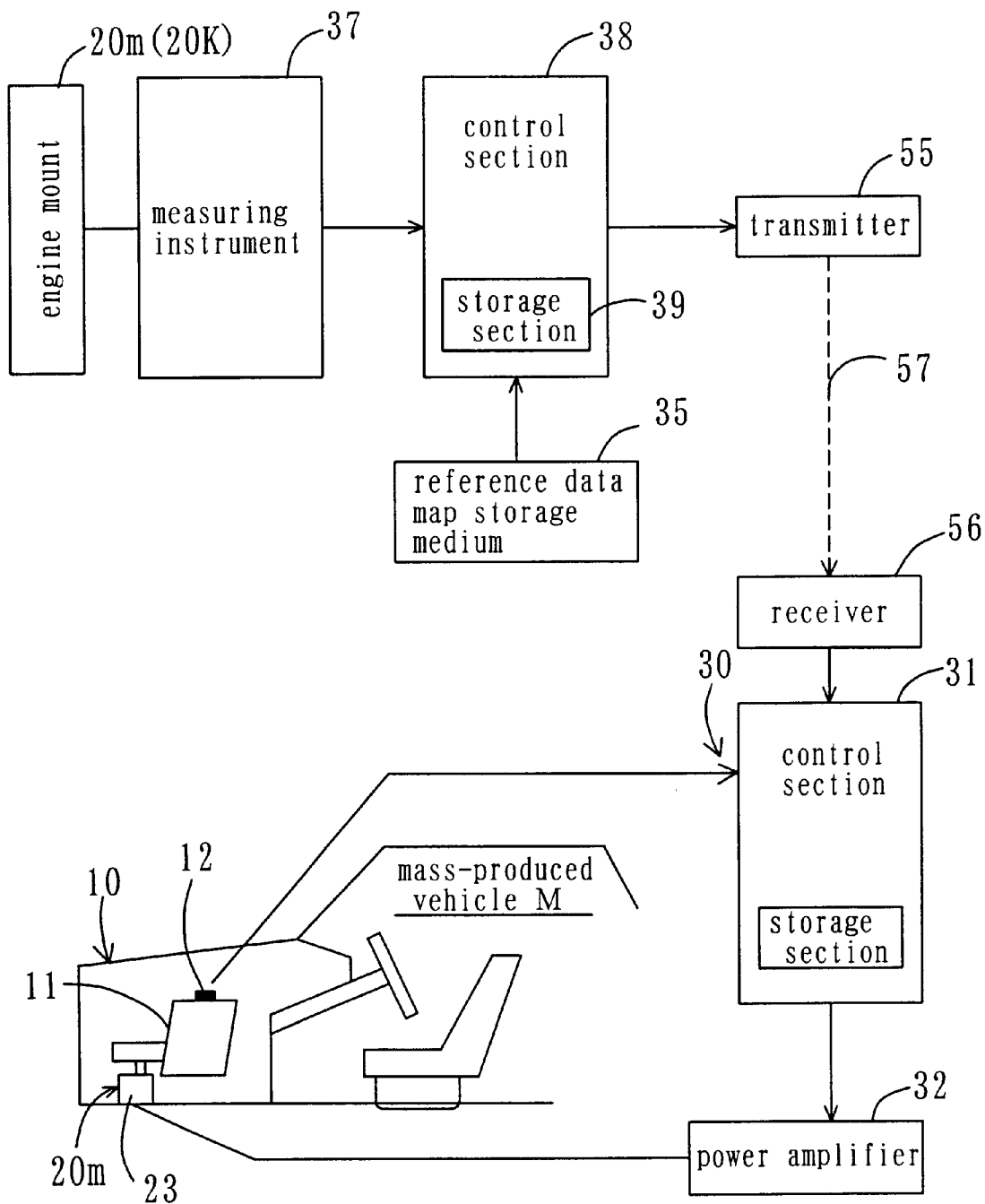
FIG. 5 is a diagram schematically showing a structure in which a control data measuring system and an active control system for removing the vehicle vibration are connected to each other through a communication line.

In the previous embodiment, the reference data map and the correction data map are stored in the storage media 35 and 36 such as the CD-ROM or the like, and are sent to a producing place of the active control apparatus 30 or a vehicle-assembling place where the active control apparatus 30 is used which are different from a data obtaining place, and the data maps are set in the active control apparatus 30 there. Whereas, in this embodiment, the reference data map and the correction data map are directly sent from the data obtaining place to the producing place of the active control apparatus 30 or the vehicle-assembling place where the active control apparatus 30 is used utilizing a communication line without using the storage media. That is, as shown in FIG. 5, a transmitter 55 is connected to the control section 38 of a measuring system, a receiver 56 for the active control apparatus 30 of the mass-produced vehicle M is prepared, and the transmitter 55 and the receiver 56 are connected with each other through a communication line 57.

In this embodiment, a reference data map which is a renewal data of the optimal filter coefficient obtained by the adaptation control is stored in the storage section 39 of the control section 38 for the reference engine mount 20k in the reference vehicle F. Further, a reference data map read out from the storage section 39 is sent to the receiver 56 prepared on the side of the active control apparatus 30 of the mass-produced vehicle M through the communication line 57 by the transmitter 55, and the reference data map is input to the active control apparatus 30 of the mass-produced vehicle M from the receiver 56. Similarly, the correction data map obtained for the mass-produced engine mount 20m is calculated by the control section 38 and output to the transmitter 55. The correction data map is sent to the receiver 56 prepared on the side of the active control apparatus 30 of the mass-produced vehicle M through the communication line 57 from the transmitter 55 and input from the receiver 56 to the active control apparatus 30.

With this feature, in this embodiment also, vibration of a vehicle body can be actively controlled appropriately with low variation inexpensively by a simple structure in accordance with variation of the mass-produced engine mount 20m as shown in the previous embodiment. Further, data is transmitted from the data-forming side to a side to which data is input to the active control apparatus 30 utilizing the communication line. Therefore, the data can reliably be transmitted within a short time, which is extremely convenient.

Both the reference data map and the correction data map can be sent to the active control apparatus 30 of the mass-produced vehicle at the same time, but usually, it is more convenient that only the reference data map which is formed first is sent to the active control apparatus 30 from the control section 31 of the experiment vehicle M, and the correction data map which is newly obtained by mass producing the engine mount is sent to the active control apparatus 30 which is mounted to a vehicle including the engine mount 20m in accordance with provision of the engine mount 20m.

The reference data map and the correction data map may be input to the active control apparatus 30 of the mass-produced vehicle using both a method of adding the storage medium and a method of using communication.

In each of the above embodiments, the crankshaft revolution pulse signal of the engine is used as a pulse signal from the vibration generation source, but it is also possible to use a state detection signal of a vehicle such as accelerator opening, running speed, ON/OFF of air conditioner, shift position and water temperature obtained by an engine control unit. Although the DXHS LMS filter is used as the adaptation filter in each of the embodiments, another adaptation filter such as a Filtered-XLMS filter may also be used. As the control data, the filter coefficient data is calculated by the adaptation control and this is formed as a map, but the invention is not limited to this, and it is also possible to obtain the control data by another control method to form a data map. For example, under a certain driving condition, the active control is carried out using arbitrarily set filter coefficient (gain, phase), and vibration noise characteristic is measured or sensuality is evaluated. Further, measurement and sensuality evaluation are repeated under different filter coefficient setting. From variously set filter coefficient conditions, a condition exhibiting the best vibration noise characteristic is selected, and this is determined as an active control condition. This operation is carried out under various driving conditions (engine revolution number, vehicle speed, engine load or the like), and a reference map of control is determined.

The input of the reference data map and the correction data map to the active control apparatus 30 of the mass-produced vehicle is not limited to the above method. The present invention can also be applied to an active mount other than the engine mount. The above embodiments are only examples, and the invention can variously be modified and carried out without departing from the subject matter of the invention.

What is claimed is:

1. A control data setting method of an active mount control apparatus in which a pulse signal of periodicity is applied from a vibration generating source of a vehicle to an active mount which is a mount having a vibrator provided in the vehicle to obtain said control data of said active mount in a frequency band to be controlled to suppress vehicle body vibration, thereby forming a data map, said data map is input to said active mount control apparatus which suppresses external force from said vibration generating source by controlling motion of said vibrator based on the control data, wherein a reference mount characteristic which is a mount characteristic of a reference active mount is previously measured, the control data of a reference vehicle having the reference active mount is obtained and this is determined as a reference data map, a mass-produced mount characteristic which is a mount characteristic of at least one of mass-produced active mounts of a predetermined production unit is measured, the reference mount characteristic and the mass-produced mount characteristic are compared with each other to form a correction data map for correcting deviation of control data corresponding to said mass-produced active mount from said reference data map, and said reference data map and said correction data map are input to said active mount control apparatus provided in a mass-produced vehicle having said mass-produced active mount.

2. A control data setting method of an active mount control apparatus according to claim 1, wherein said reference data map is previously input to said active mount control apparatus, and said correction data map corresponding to said mass-produced active mount mounted in a mass-produced vehicle is input.

3. A control data setting method of an active mount control apparatus according to claim 1, wherein said reference data map and said correction data map corresponding to a mass-produced active mount mounted to a mass-produced vehicle are integrally input to said active mount control apparatus.

4. A control data setting method of an active mount control apparatus according to claim 1, wherein a data storage medium stores said reference data map or said correction data map.

5. A control data setting method of an active mount control apparatus according to claim 1, wherein a data storage medium stores said reference data map and said correction data map.

6. A control data setting method of an active mount control apparatus according to claim 2, wherein said reference data map and/or said correction data map is input to said active mount control apparatus through a communication line.

7. A control data setting method of an active mount control apparatus according to claim 2, wherein a storage medium storing said reference data map or a storage medium storing said correction data map is formed, said storage medium is added to said active mount control apparatus.

8. A control data setting method of an active mount control apparatus according to claim 2, wherein a storage medium storing said reference data map and a storage medium storing said correction data map is formed, said storage medium is added to said active mount control apparatus.

9. A control data setting method of an active mount control apparatus according to claim 2, wherein either one of said reference data map and said correction data map is input to said active mount control apparatus through a communication line, and the other one of them is input to said active mount control apparatus by adding a storage medium which stores the other data map.

10. A control data setting method of an active mount control apparatus according to claim 3, wherein said reference data map and said correction data map input to said active mount control apparatus through a communication line.

11. A control data setting method of an active mount control apparatus according to claim 3, wherein a storage medium which stores said reference data map and said correction data map is added to said active mount control apparatus.

* * * * *